United States Patent
Guntur et al.

(10) Patent No.: US 10,942,748 B2
(45) Date of Patent: Mar. 9, 2021

(54) METHOD AND SYSTEM FOR PROCESSING INTERRUPTS WITH SHADOW UNITS IN A MICROCONTROLLER

(71) Applicant: NXP B.V., Eindhoven (NL)

(72) Inventors: Surendra Guntur, Eindhoven (NL); Sebastien Antonius Josephus Fabrie, Eindhoven (NL); Jose de Jesus Pineda de Gyvez, Eindhoven (NL)

(73) Assignee: NXP B.V., Eindhoven (NL)

( * ) Notice: Subject to any disclaimer, the term of this patent is extended or adjusted under 35 U.S.C. 154(b) by 440 days.

(21) Appl. No.: 14/800,952

(22) Filed: Jul. 16, 2015

(65) Prior Publication Data
US 2017/0017486 A1 Jan. 19, 2017

(51) Int. Cl.
*G06F 9/38* (2018.01)
*G06F 9/30* (2018.01)
*G06F 9/32* (2018.01)

(52) U.S. Cl.
CPC ........ *G06F 9/3885* (2013.01); *G06F 9/30134* (2013.01); *G06F 9/327* (2013.01); *G06F 9/3836* (2013.01); *G06F 9/3857* (2013.01); *G06F 9/3867* (2013.01); *G06F 9/30123* (2013.01); *G06F 9/30181* (2013.01)

(58) Field of Classification Search
CPC ............ G06F 9/3005; G06F 9/300098; G06F 9/30123; G06F 9/3863; G06F 9/4812; G06F 13/24; G06F 9/30134; G06F 9/30181; G06F 9/30116; G06F 9/4856
See application file for complete search history.

(56) References Cited

U.S. PATENT DOCUMENTS

| 4,394,730 A * | 7/1983 | Suzuki ................. G06F 9/4812 710/1 |
| 4,456,965 A * | 6/1984 | Graber ................ G06F 13/4022 710/100 |
| 5,944,816 A * | 8/1999 | Dutton .................. G06F 9/3851 710/266 |
| 6,081,896 A * | 6/2000 | Johns-Vano ........ G06F 9/30025 710/1 |
| 6,209,086 B1* | 3/2001 | Chi ....................... G06F 9/3806 712/238 |
| 6,378,022 B1 | 4/2002 | Moyer et al. |

(Continued)

FOREIGN PATENT DOCUMENTS

| EP | 0856800 A1 | 5/1998 |
| WO | 2008118949 A1 | 10/2008 |

OTHER PUBLICATIONS

ARM Cortex-M3 Processor, Technical Reference Manual, Revision r2p1; www.arm.com; 122 pgs; 2015.

(Continued)

*Primary Examiner* — William B Partridge (57) ABSTRACT

In an embodiment, a method for processing instructions in a microcontroller is disclosed. In the embodiment, the method involves, upon receipt of an interrupt while an instruction is being executed, completing execution of the instruction by a shadow functional unit and, upon servicing the interrupt, terminating re-execution of the instruction and updating a main register file with the result of the execution of the instruction by the shadow functional unit.

19 Claims, 9 Drawing Sheets

(56) References Cited

U.S. PATENT DOCUMENTS

| | | | | |
|---|---|---|---|---|
| 7,197,627 | B1* | 3/2007 | Naylor | G06F 9/30098 |
| | | | | 712/229 |
| 7,698,542 | B2* | 4/2010 | Mohr | G06F 7/026 |
| | | | | 712/300 |
| 2003/0028696 | A1* | 2/2003 | Catherwood | G06F 9/325 |
| | | | | 710/260 |
| 2009/0044044 | A1* | 2/2009 | Harter | G06F 11/1407 |
| | | | | 714/6.23 |
| 2009/0217019 | A1* | 8/2009 | Gross | G06F 9/3851 |
| | | | | 712/244 |
| 2012/0233477 | A1* | 9/2012 | Wu | G06F 1/3287 |
| | | | | 713/320 |
| 2014/0026146 | A1* | 1/2014 | Jahagirdar | G06F 9/4856 |
| | | | | 718/105 |
| 2014/0095851 | A1* | 4/2014 | Gerwig | G06F 9/3865 |
| | | | | 712/244 |
| 2014/0223220 | A1 | 8/2014 | Guntur et al. | |

OTHER PUBLICATIONS

Cortex-M3, Technical Reference Manual (revision r2p0). www.arm.com; 133 pgs.; 2015.
European Search Report, 16177445, dated Nov. 29, 2016.

* cited by examiner

```
UP.  PC1:   R2 ← 5;                    // STORE OPERAND1 VALUE = 5 IN REGISTER R2
     PC2:   R3 ← 4;                    // STORE OPERAND2 VALUE = 4 IN REGISTER R3
     PC3:   UMULL R0, R1, R2, R3;      // R2 * R3.  R1 = 0 (HIGH WORD RESULT).  R0 = 20 (LOW WORD OF RESULT)
     PC4:   STR  R0,[R4], #4;          // STORE RESULT IN R0 IN MEMORY LOCATION POINTED TO BY R4 AND INCREMENT ADDRESS
     PC5:   STR  R1,[R4];              // STORE RESULT IN R1 IN MEMORY LOCATION [R4]  (NOTE THAT ADDRESS HAS BEEN
                                       // AUTO-INCREMENTED BY 4 BY THE PREVIOUS INSTRUCTION)
     PC6:   B    UP;                   // BRANCH TO LABEL UP
```

METHOD AND SYSTEM FOR PROCESSING INTERRUPTS WITH SHADOW UNITS IN A MICROCONTROLLER

BACKGROUND

A microcontroller is a computing device formed on an integrated circuit. Modern microcontrollers are typically configured to process exceptions and interrupts during the execution of a program by interrupting the execution of a program to handle the exceptions and service the interrupts. The interruption of the execution of a program can delay the execution time of a program or, in some cases, halt the execution of the program until the exceptions and interrupts have been handled.

SUMMARY

In an embodiment, a method for processing instructions in a microcontroller is disclosed. In the embodiment, the method involves, upon receipt of an interrupt while an instruction is being executed, completing execution of the instruction by a shadow functional unit and, upon servicing the interrupt, terminating re-execution of the instruction and updating a main register file with the result of the execution of the instruction by the shadow functional unit.

In an embodiment, terminating re-execution involves comparing a program counter and operands of the interruptible instruction with program counters and operands stored in a shadow register file and, if the comparison finds a match between the PC and operands of the instruction and a PC and corresponding operands in the shadow register file is found, then a main register file is updated with the result associated with the match and, if the comparison does not find a match between the PC and operands of the instruction and a PC and corresponding operands in the shadow register file, then the main register file is updated with a result computed by the shadow functional unit using the program counter and operands of the interruptible instruction.

In an embodiment, the method for processing instructions in a microcontroller further includes comparing a program counter and operands of the interruptible instruction with program counters and operands stored in a shadow register file by using a set of comparators.

In an embodiment, the shadow functional unit is activated when the interruptible instruction is fetched from instruction memory.

In an embodiment, the shadow functional unit is activated when the interrupt is received.

In an embodiment, completing execution of the interruptible instruction by the shadow functional unit further involves storing the result in a shadow register file.

In an embodiment, if a second interrupt is received before the received interrupt is serviced, the method for processing instructions in a microcontroller further involves servicing the second interrupt before terminating re-execution of the interruptible instruction.

In an embodiment, the method for processing instructions in a microcontroller further involves, servicing the interrupt with the highest priority if a plurality of interrupts are received before a microcontroller core begins to service an interrupt in the plurality of interrupts.

In an embodiment, prior to the receipt of an interrupt and the execution of an interruptible instruction, the method further involves comparing a program counter and operands of the interruptible instruction with program counters and operands stored in a shadow register file and, if a match between the PC and operands of the instruction and a PC and corresponding operands in the shadow register file is found, then execution of the interruptible instruction is terminated and a main register file is updated with the result associated with the match and, if there a match between the PC and operands of the instruction and a PC and corresponding operands in the shadow register file is not found, then the interruptible instruction is executed.

In a second embodiment, a system for processing instructions in a microcontroller is disclosed. In the embodiment, the system includes an interface, the interface configured to receive an interrupt, a microcontroller core coupled to the interface, the microcontroller core configured to interrupt the execution of an instruction to service a received interrupt, memory coupled to the microcontroller core, the memory configured to store the instruction and a handler for the interrupt, and a shadow functional unit coupled to the interface and the memory, the shadow functional unit configured to execute the interrupted instruction.

In an embodiment, the system further includes comparators, the comparators configured to compare a program counter and operands of the interrupted instruction with program counters and operands in an shadow register file and, if a match between the PC and operands of the instruction and a PC and corresponding operands in the shadow register file is found, terminate re-execution of the interrupted instruction after the received interrupt has been serviced and update a main register file (MRF) with a result corresponding to the match and, if a match between the PC and operands of the instruction and a PC and corresponding operands in the shadow register file is not found, direct the shadow functional unit to execute the interrupted instruction to compute a result and to update the MRF with the computed result.

In an embodiment, the system further includes comparators that are configured to compare a program counter and operands of the interrupted instruction with program counters and operands in a shadow register file.

In an embodiment, the system further includes a shadow functional unit configured to be inactive until an interrupt is received.

In an embodiment, the system further includes a shadow functional unit configured to concurrently receive the instruction when the microcontroller core fetches the instruction.

In an embodiment, the system further includes a shadow functional unit configured to store the result of executing the interrupted instruction in a shadow register file.

In an embodiment, the system further includes a microcontroller core configured to service a second received interrupt before re-executing the interrupted instruction.

In an embodiment, the system further includes an interface configured to receive a plurality of interrupts and a microcontroller core is configured to service the interrupts based on the priority of the interrupt.

In an embodiment, the system further includes comparators configured to compare a program counter and operands of the instruction with program counters and operands in an shadow register file and, if a match between the PC and operands of the instruction and a PC and corresponding operands in the shadow register file is found, terminate execution of the instruction and update a MRF with a result corresponding to the match and, if a match between the PC and operands of the instruction and a PC and corresponding operands in the shadow register file is not found, direct the shadow functional unit to execute the instruction to compute a result and to update the MRF with the computed result.

In an embodiment, the system further includes memory configured to store the MRF and the shadow register file.

In a third embodiment, an integrated circuit (IC) device is disclosed. In the embodiment, the IC device includes a microcontroller system having an interface, the interface configured to receive an interrupt, a microcontroller core coupled to the interface, the microcontroller core configured to interrupt the execution of an instruction to service a received interrupt, memory coupled to the microcontroller core, the memory configured to store the instruction and a handler for the interrupt, and a shadow functional unit coupled to the interface and the memory, the shadow functional unit configured to execute the interrupted instruction, and peripherals coupled to the microcontroller configured to detect conditions for generating interrupts and transmitting interrupts to the interface accordingly.

Other aspects and advantages of embodiments of the present invention will become apparent from the following detailed description taken in conjunction with the accompanying drawings.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
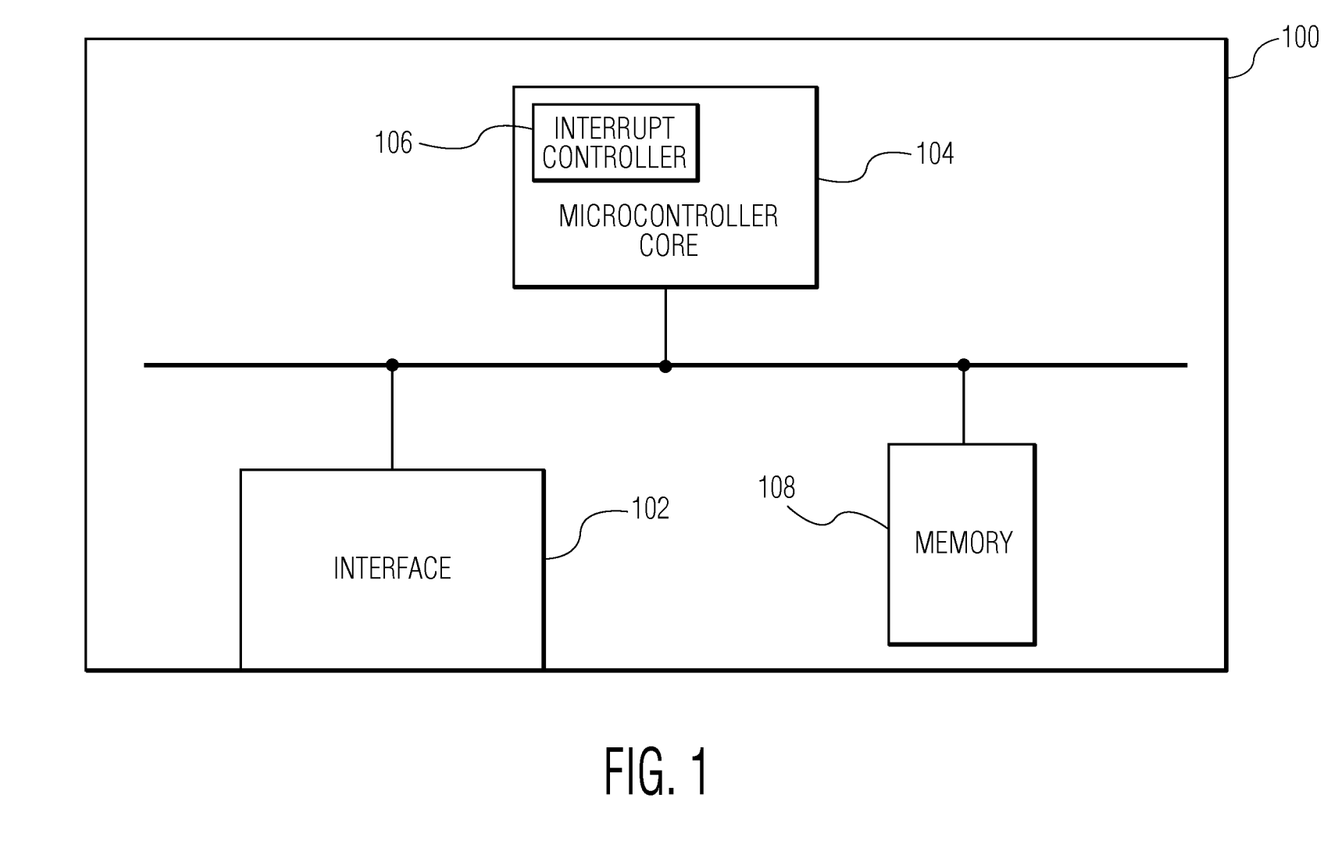
FIG. 1 depicts a diagram of a microcontroller system having an interface, a main microcontroller core unit with an interrupt controller, and memory.

FIG. 1 depicts a diagram of a microcontroller system 100 having an interface 102, a microcontroller core 104 with an interrupt controller 106, and memory 108. In an embodiment, the interface can include multiple interfaces such as a controller area network bus (CAN bus), a serial peripheral interface bus (SPI bus), a universal asynchronous receiver/transmitter (UART), a high-speed USB (HS USB), an external memory controller, a synchronous serial port (SSP), Ethernet, a secure digital input output (SDIO), an inter-integrated circuit bus ($I^2C$ bus), an LCD controller, a quad encoder interface, and an inter-integrated circuit sound bus ($I^2S$ bus). The microcontroller core can be, for example, an ARM Cortex M0+, M0, M3, or M4 processor having a NVIC configured to support external interrupts (e.g., handling and prioritization of the interrupts). In an embodiment, the memory can be flash, SRAM, and/or ROM configured to store instructions for execution, results of the execution of the instructions, and handlers for interrupts.

Figure 2:
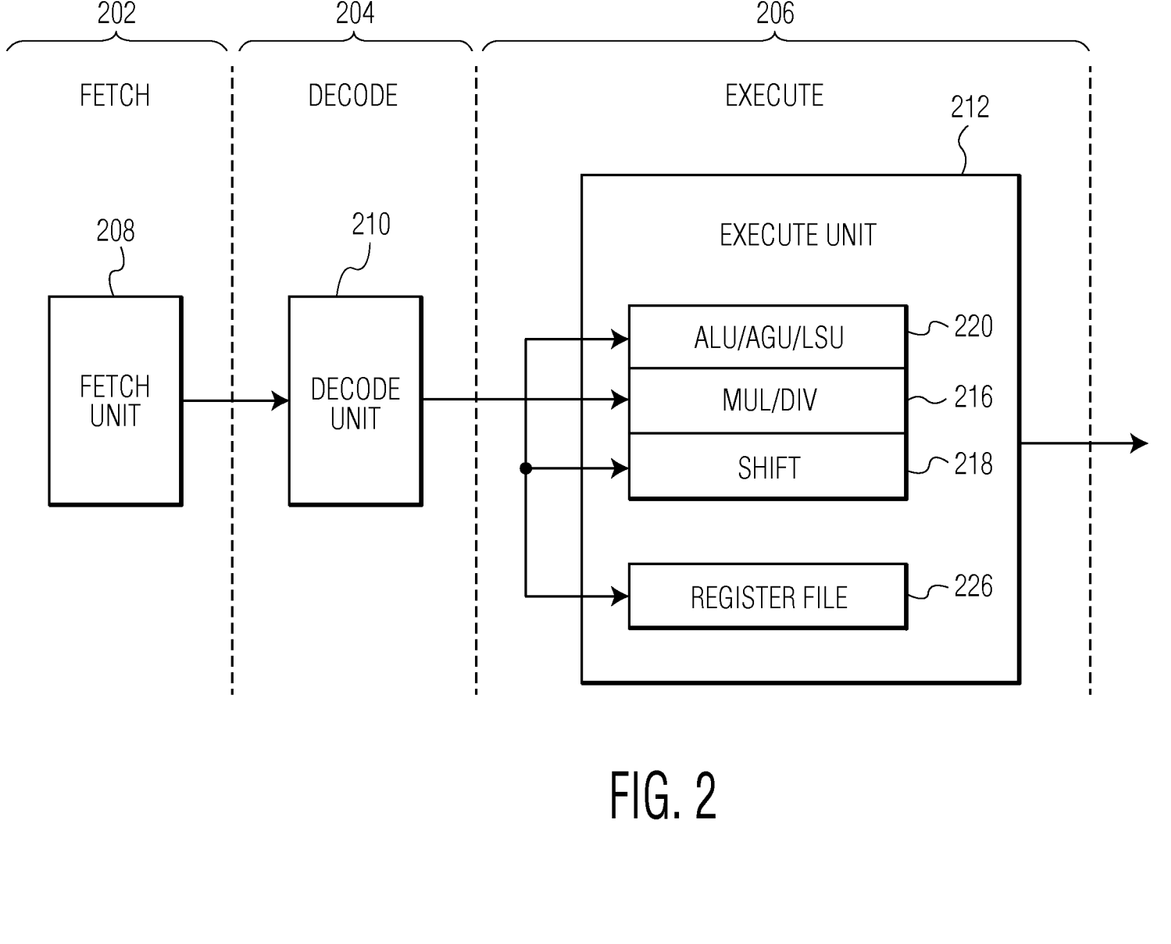
FIG. 2 illustrates a three-stage pipeline of a microcontroller.

In an embodiment, instructions are processed by a microcontroller, such as the microcontroller depicted in FIG. 1, along a three-stage pipeline. FIG. 2 illustrates a three-stage pipeline of a microcontroller. In an embodiment, the three-stage pipeline involves a fetch stage 202, a decode stage 204, and an execute stage 206. In the fetch stage, an instruction is fetched from memory by a fetch unit 208 and, in the decode stage, the fetched instruction is decoded by a decode unit 210. In the execute stage, the decoded instruction is executed in an execute unit 212 by an arithmetic logic unit (ALU)/address generation unit (AGU)/load-store unit (LSU) 220, a multiply/divide (MUL/DIV) unit 216, or a shift unit 218. For example, a multiply or divide instruction would be executed in the execute unit by the MUL/DIV unit, while other operations, such as shifts and additions, would be computed in the shift unit or in the ALU/AGU/LSU unit, respectively. In an embodiment, input data values needed for a computation are read from an internal register file 226 (e.g., an SRAM based file) by the decode unit and, after execution by the execute unit, intermediate data values and results are stored in the register file in a process referred to as "writeback." In an embodiment, the register file is small (e.g. 16 registers of 4 bytes each as is the case on Cortex M3/M4 processors) and data may have to be stored/moved to memory, such as the memory 108 of FIG. 1.

Figure 3:
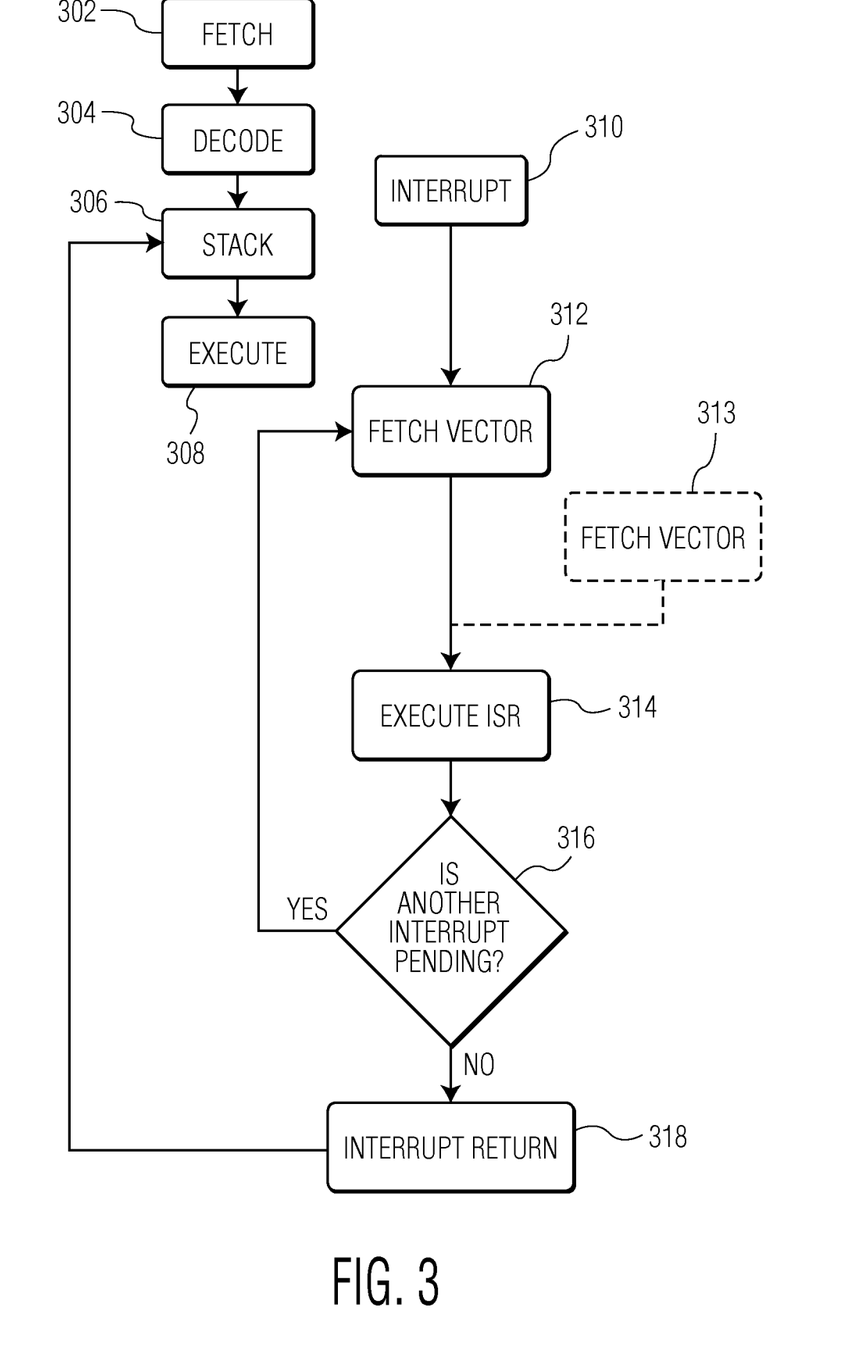
FIG. 3 is a flow chart diagram of a technique for servicing an interrupt and re-processing an interrupted instruction in a microcontroller.

In an embodiment, when an interrupt is received, the three-stage pipeline, as illustrated in FIG. 2, is modified to service the interrupt and process the interrupted instruction. FIG. 3 is a flow chart diagram of a technique for servicing an interrupt and re-processing an interrupted instruction in a microcontroller. As described with reference to FIG. 2 above, at block 302, an instruction is fetched and, at block 304, the instruction is decoded. During normal execution, the decoded instruction is executed, but, when an interrupt is received, the technique is altered. Once the instruction is decoded, execution of the instruction begins, but, at block 310, an interrupt is received before execution of the instruction can be completed. In an embodiment, an instruction can be interrupted during its execution when it is an interruptible instruction (e.g., signed/unsigned divide, signed/unsigned multiply, signed/unsigned multiply with accumulate, etc.). At block 306, a block of eight words (made up of a program counter (PC) for the instruction, a program status register (PSR), registers R0-R3 and R12, and a Link Register (LR) and referred to as a "stack frame") are pushed to a stack. In an embodiment, the stack frame is pushed to the stack via the advanced high-performance bus (AHB interface) over eight cycles (because the stack frame has eight words). While a data bus is pushing the stack frame to the stack, an instruction bus fetches a vector (e.g., an interrupt service routine corresponding to the interrupt received) from memory at block 312. In an embodiment, a second interrupt can be received while the vector is being fetched (or while the interrupt service routine is being executed, as described below with reference to block 314) and, at block 313, a vector for the second interrupt is fetched and the second interrupt enters a pending state. If the vector for a second interrupt having a higher priority than the first interrupt is fetched before execution of the interrupt service routine (ISR) of the first interrupt has begun (referred to as a "late arrival"), then the first interrupt enters a pending state. At block 314, the ISR fetched at block 312 (or the ISR of the late arrival fetched at block 313) is executed. At decision point 316, it is determined if a second interrupt is pending and, if a second interrupt is pending, then the technique returns to block 312 fetches a vector for the second interrupt (e.g., the vector fetched at block 313) and executes the fetched ISR (referred to as "tail-chaining"). If no further interrupts are pending, then, at block 318, an interrupt return occurs and re-execution of the interrupted instruction is performed, at block 306, by unstacking the stack frame from the stack and, at block 308, executing the interrupted instruction from the beginning in order to correctly compute intermediate computations as needed.

Figure 4:
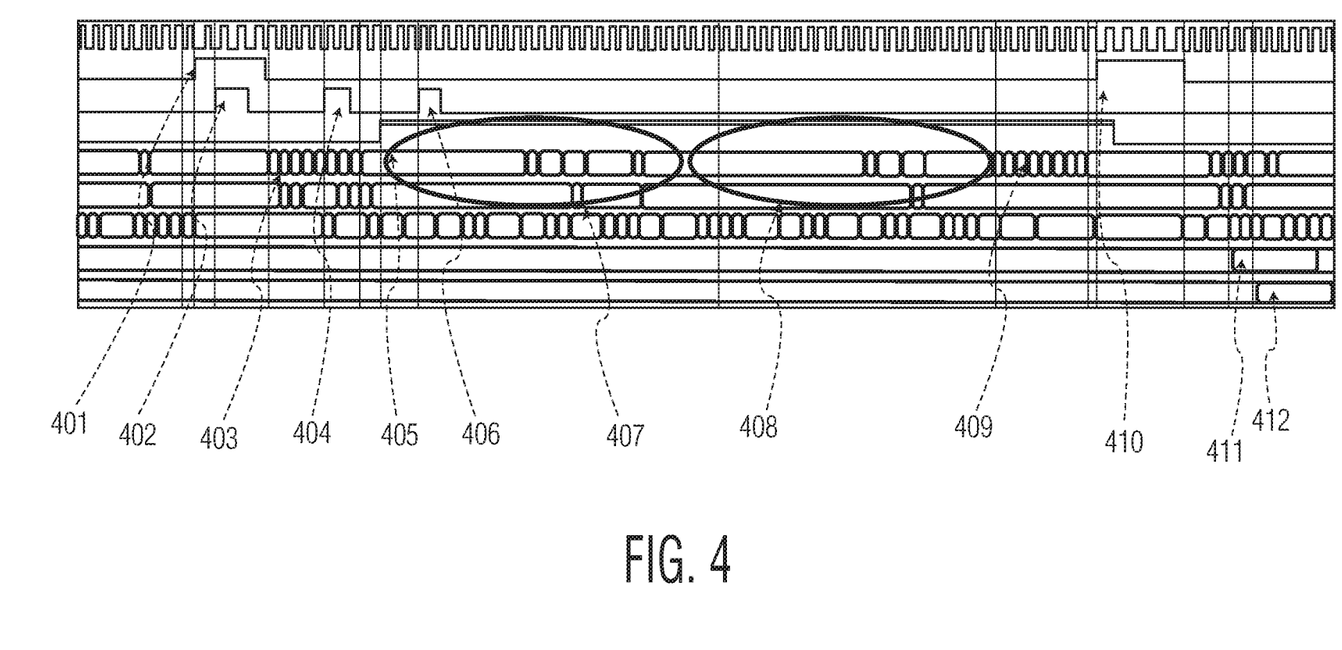
FIG. 4 illustrates a timing diagram of a sequence of events that occur when an interrupt is received during the execution of an instruction.

As an example of the technique described with reference to FIG. 3, FIG. 4 illustrates a timing diagram of a sequence of events that occur when an interrupt is received during the execution of an instruction. At event 401, a multi-cycle interruptible instruction is being executed (e.g., three of five cycles needed to execute an unsigned multiply instruction have been performed) when, at event 402, a first interrupt occurs. As a result, the instruction is aborted and, at event 403, the stacking of registers R0-R3, PC, LR, and PSR is initiated, for example, by the interrupt controller. At event 404, a second interrupt with the same priority as the first interrupt occurs and enters a pending state (the second interrupt arrived second and with equal or lower priority so the second interrupt is not a late arrival). At event 405, an ISR corresponding to the first interrupt (ISR1) is executed. At event 406, a third interrupt is received, but ISR1 contains a function that disables interrupts so the third interrupt will not be serviced. At event 407, ISR1 continues to execute until, at event 408, ISR1 completes and an ISR corresponding to the second interrupt (ISR2) is executed (e.g., tail-chaining). At event 409, the registers pushed on the stack at event 403 are unstacked (e.g., by a POP instruction) and, at event 410, the interrupted instruction is re-executed successfully (e.g., starting over at the first cycle and performing all five cycles.) At event 411 and 412, a memory is updated with the result of the execution of the interrupted instruction.

While the technique described above with reference to FIGS. 2-4 allows for processing interrupted instructions and servicing interrupts, the technique involves starting the execution of an instruction over during re-execution. For example, an unsigned multiply instruction takes five cycles to complete. If an interrupt occurs after two cycles, the instruction is aborted and, when re-executed, begins again at the first cycle, thus wasting two cycles of processing. While the impact on the performance time of the instruction is minimal in this example (e.g., 2 additional cycles), some instructions can take as many as twelve cycles to complete and, if interrupted on the eleventh cycle, would waste eleven cycles, thereby having a substantial performance impact.

In accordance with an embodiment of the invention, a method for processing instructions in a microcontroller is disclosed. In an embodiment, the method involves, upon receipt of an interrupt, completing execution of an instruction by a shadow functional unit and, upon servicing the interrupt, terminating re-execution of the instruction and updating a main register file with the result of the execution of the instruction by the shadow functional unit. Thus, when an execution of an instruction by a microcontroller core is interrupted, the shadow functional unit can finish execution of the instruction and the instruction does not need to be re-executed (starting with the first cycle operation) after the interrupt(s) have been serviced by the microcontroller core because the result of the execution by the shadow functional unit can be used by the microcontroller core. For example, if an interrupt occurs two cycles into the execution of an unsigned multiply instruction, the shadow functional unit can complete the remaining 3 cycles and update memory accessible to the microcontroller core with the result, while, at the same time, the microcontroller core services the interrupt. Accordingly, cycles spent executing an instruction before an interrupt occurs are not wasted when the instruction is re-executed.

Figure 5:
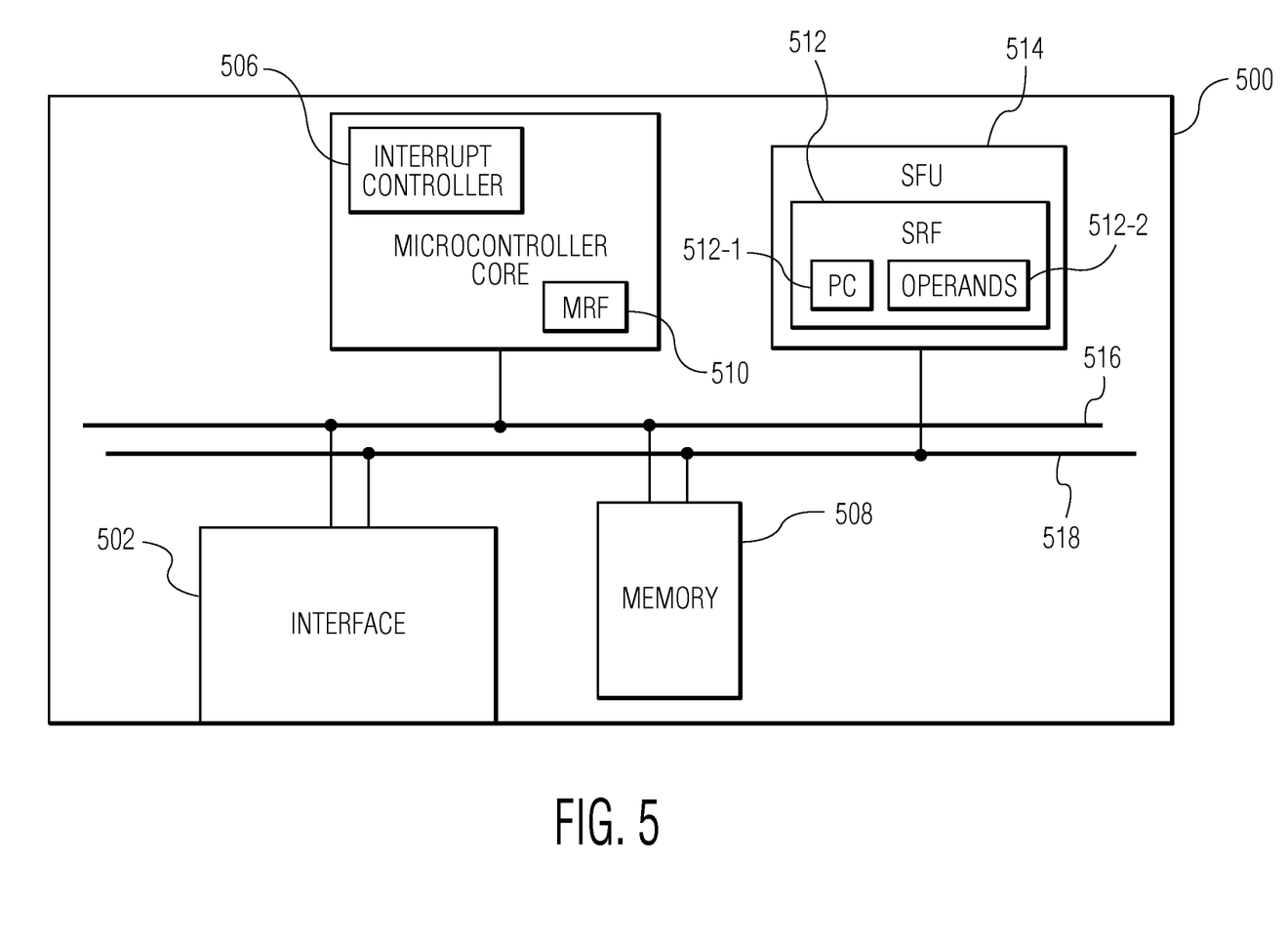
FIG. 5 depicts a diagram of a microcontroller system with a shadow functional unit in accordance with an embodiment of the invention.

As described above, a shadow functional unit can be used to process interrupted instructions. FIG. 5 depicts a diagram of a microcontroller system 500 with a shadow functional unit (SFU) 514 in accordance with an embodiment of the invention. In an embodiment, the microcontroller system has an interface 502, a microcontroller core or main microcontroller core 504 with an interrupt controller 506 and a main register file (MRF) 510, memory 508, and the shadow functional unit with a shadow register file (SRF) 512 (the SRF storing several PCs 512-1 and corresponding operands 512-2) interconnected by a first and second bus 516, 518. In an embodiment, the interface can include multiple interfaces such as a controller area network bus (CAN bus), a serial peripheral interface bus (SPI bus), a universal asynchronous receiver/transmitter (UART), high-speed USB (HS USB), an external memory controller, a synchronous serial port (SSP), Ethernet, a secure digital input output (SDIO), an inter-integrated circuit bus (I$^2$C bus), an LCD controller, a quad encoder interface, and an inter-integrated circuit sound bus (I$^2$Sbus). The microcontroller core can be, for example, an ARM Cortex M0+, M0, M3, or M4 processor having a NVIC configured to support external interrupts (e.g., handling and prioritization of the interrupts). In an embodiment, the memory can be flash, SRAM, and/or ROM that is configured to store instructions for execution, results of the execution of the instructions (either by the microcontroller core in the MRF or by the shadow functional unit in the shadow register file), and handlers for interrupts. In an embodiment, the shadow functional unit is a functional until that can execute all interruptible instructions and can be physically separate from the microcontroller core (e.g., facilitated by separate components than components of the microcontroller core) or can be part of the microcontroller core (e.g., facilitated by the components of the microcontroller core). For example, in the case of a Cortex-M3 microcontroller, the shadow functional unit is a separate functional unit having only a multiply/divide functional unit (although the microcontroller can be configured with additional functional units) because all interruptible commands are either multiply or divide instructions. In an embodiment, the shadow functional unit can be configured to process instructions concurrently with the microcontroller core or configured to remain inactive until an interrupt occurs. In an embodiment, the microcontroller core is connected to the interface and memory on the first bus 516 and the shadow functional unit is connected to the interface and memory on the second bus 518. Thus, if the microcontroller core is servicing an interrupt, the shadow functional unit can continue executing an instruction.

Figure 6:
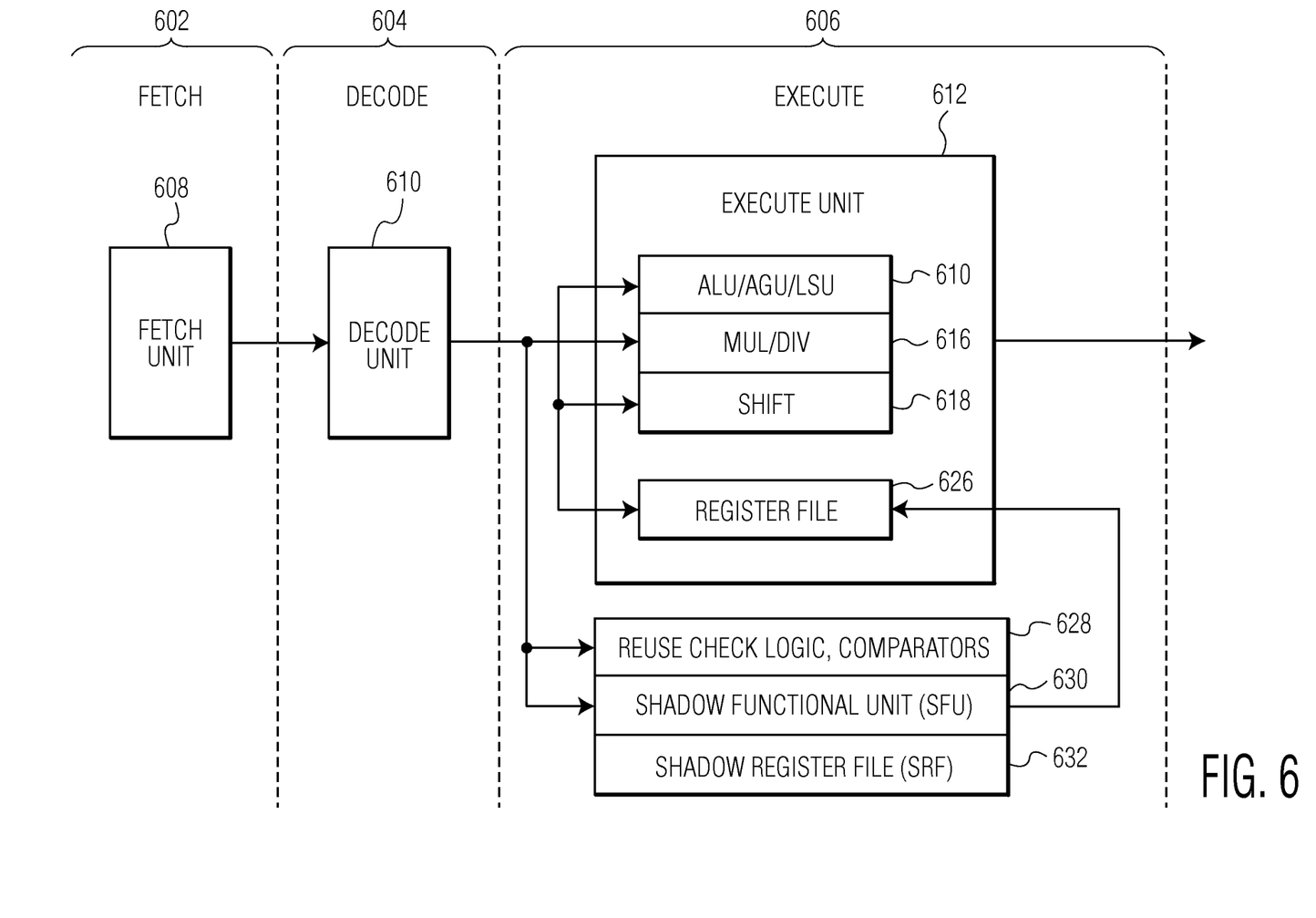
FIG. 6 illustrates a three-stage pipeline of a microcontroller with a shadow functional unit in accordance with an embodiment of the invention.

In an embodiment, instructions are processed by a microcontroller with an shadow functional unit, such as the microcontroller depicted in FIG. 5, along a three-stage pipeline. FIG. 6 illustrates a three-stage pipeline of a microcontroller with a shadow functional unit in accordance with an embodiment of the invention. In an embodiment, the three-stage pipeline involves a fetch stage 602, a decode stage 604, and an execute stage 606. In the fetch stage, an instruction is fetched from memory by a fetch unit 608 and, in the decode stage, the fetched instruction is decoded by a decode unit 610. In the execute stage, the decoded instruction is executed in an execute unit 612 by an ALU/AGU/LSU unit 620, a MUL/DIV unit 616, or a shift unit 618. For example, a multiply or divide instruction would be executed in the execute unit by the MUL/DIV unit while other operations, such as shifts and additions, would be computed in the shift unit or the ALU/AGU/LSU unit, respectively. In an embodiment, input data values needed for a computation are read from an internal register file 626 (e.g., an SRAM based file) by the decode unit and, after execution by the execute unit, intermediate data values and results are stored in the register file in a process referred to as "writeback." In an embodiment, when a shadow functional unit is active, reuse check logic and comparators 628 are used to determine if a result for an instruction is in a shadow register file (SRF) 632 of a shadow functional unit 630 and, if not, the decoded instruction is executed by the shadow functional unit (e.g., by a multiply and divide unit of the shadow functional unit) and the result is updated in a shadow register file (SRF) in memory.

Figure 7:
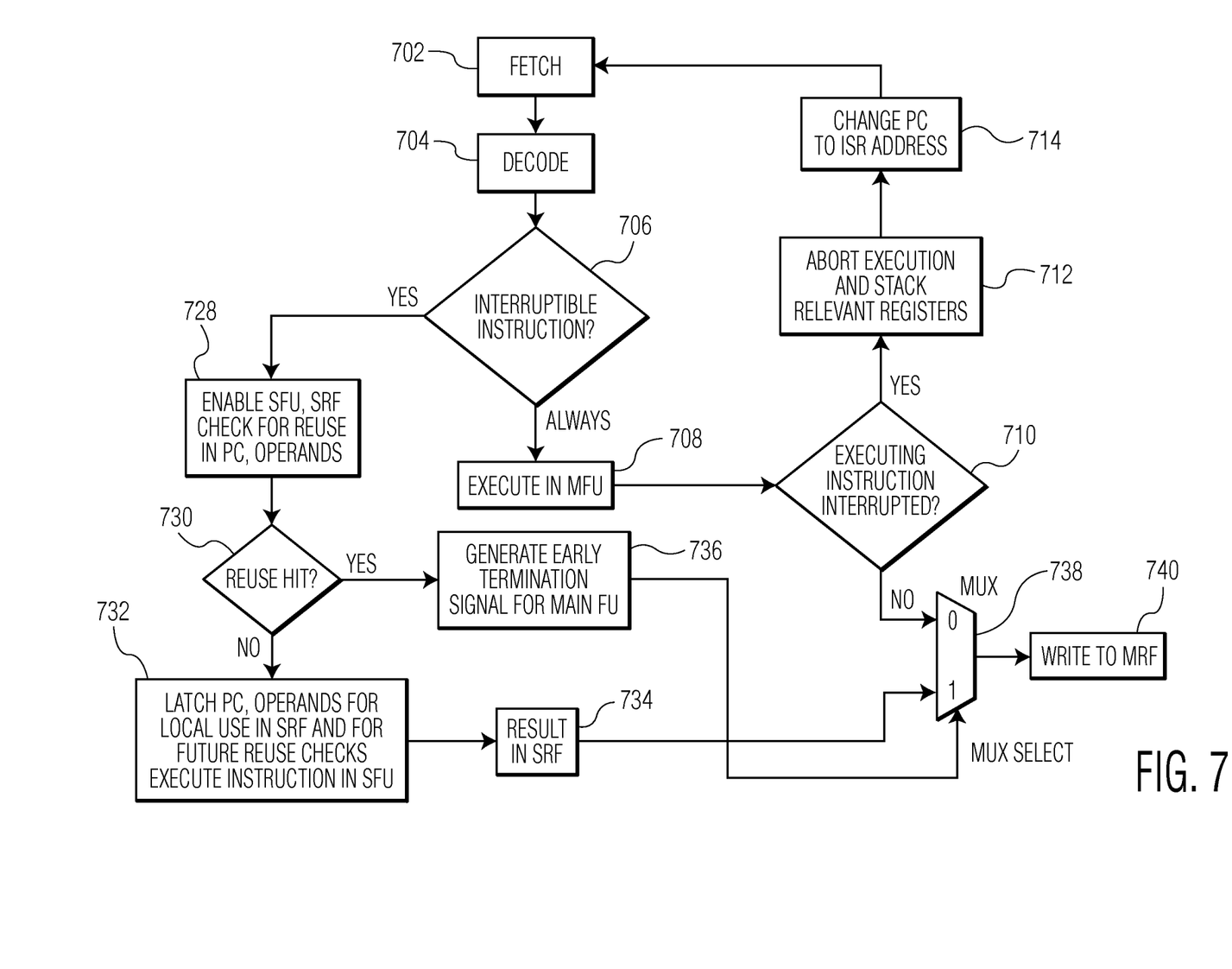
FIG. 7 is a flow chart diagram of a technique for processing interrupted instructions using the three-stage pipeline of FIG. 6 in accordance with an embodiment of the invention.

FIG. 7 is a flow chart diagram of a technique for processing interrupted instructions using the three-stage pipeline of FIG. 6 in accordance with an embodiment of the invention. As described with reference to FIG. 6 above, at block 702, an instruction is fetched and, at block 704, the instruction is decoded. At decision point 706, it is determined if the instruction is interruptible (e.g., by examining an opcode of the instruction). Whether the instruction is interruptible or not, at block 708, the instruction is always executed in the microcontroller core (as indicated by the "ALWAYS" branch) until, at decision point 710, it is determined that the instruction has finished executing or has been interrupted. If the instruction has finished executing then, at block 738, a mux select passes the result computed by the instruction along the three-stage pipeline and, at block 740, the result is written to the MRF. If the instruction is interrupted, then, at block 712, execution of the instruction is aborted, a stack frame for the instruction is pushed to the stack, and, at block 714, the PC is changed to the address of an ISR for the interrupt.

In addition to executing the instruction in the microcontroller core, if it is determined that an instruction is interruptible, at decision point 706, then, at block 728, the shadow functional unit and the SRF are enabled. Additionally, the PC and operands of the instruction are compared with PCs and operands already stored in the shadow register file and, at decision point 730, it is determined whether there is a reuse hit. In an embodiment, the determination is made by a set of comparators and a reuse hit occurs when there is a match between the PC and operands of the instruction and a PC and corresponding operands in the shadow register file. The shadow register file also stores a result computed by an instruction with the matching PC and corresponding operands. If no reuse hit is found, then, at block 732, the shadow functional unit latches the PC and operands of the instruction for local use and executes the instruction. At block 734, the result of executing the instruction is stored in the shadow register file and, at block 738, the mux select passes the result along the three-stage pipeline and, at block 740, the result is written to the MRF as well. If a reuse hit occurs, then, at block 736, an early termination signal is generated and passed to the microcontroller core and, at block 738, the result stored in the shadow register file is passed to the mux select and, at block 740, the result passed to the mux select is written to the MRF. Thus, when a reuse hit occurs, the result of executing an instruction can be written to the MRF without re-executing the interrupted instruction and clock cycles already spent executing an instruction will not need to be repeated. Because clock cycles already spent will not need to be repeated, instructions can be completed more quickly than when execution of an instruction restarts when an interrupt occurs.

Figure 8:
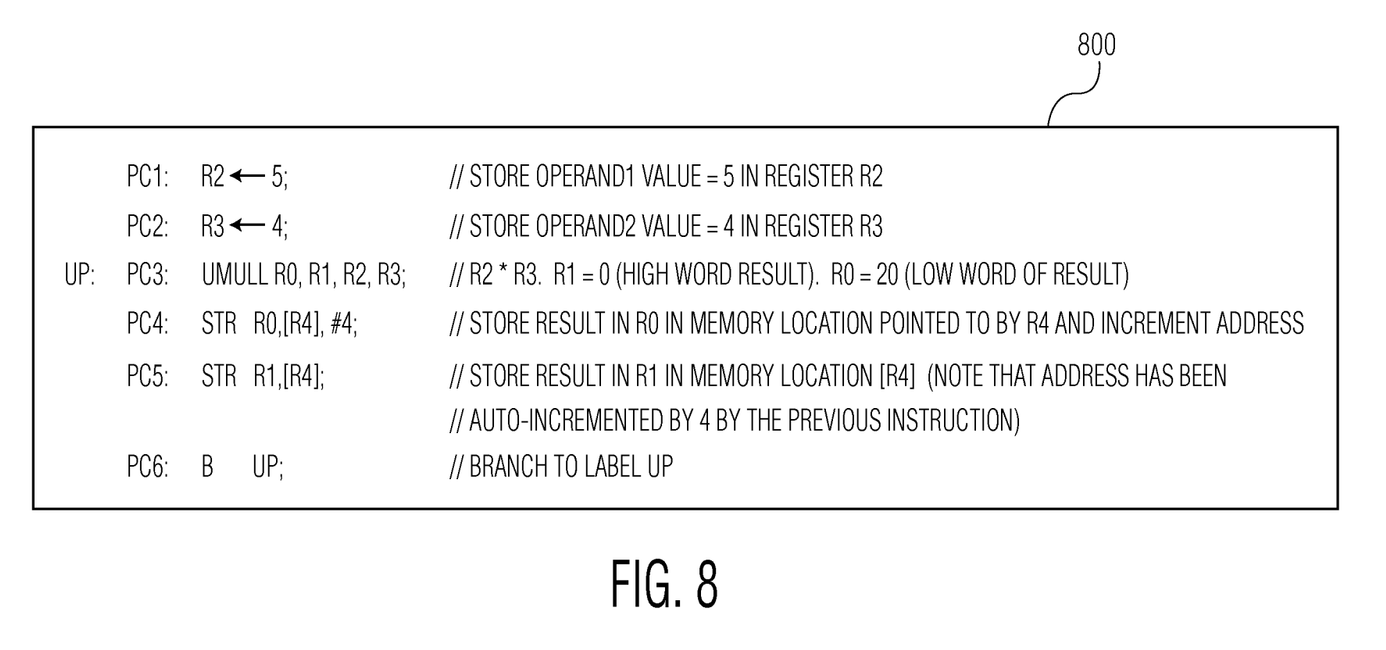
FIG. 8 is a block of pseudo-code for a sequence of instructions.

FIG. 8 is an example block of pseudo-code 800 for a sequence of instructions. In a first scenario, interrupts are disabled and an unsigned long multiply instruction (UMULL instruction) takes between three and five cycles to compute a result. In an embodiment, the same instruction is concurrently performed in a shadow functional unit and the result is stored in the shadow register file. After a branch is taken, the same instruction is executed again. However, because the shadow register file is storing the PC, operands, and the result of the instruction, a reuse hit occurs if the values in registers R2 and R3 remain unchanged and, thus, the result can be provided earlier (e.g., earlier than three to cycles) because computations do not need to be performed. Thus, subsequent execution of the same instruction will conclude more quickly than in microcontrollers without a shadow functional unit.

In a second scenario, interrupts are enabled and an interrupt occurs during the execution of the UMULL instruction in the pseudo-code. The microcontroller core aborts execution of the pseudo-code and services the interrupt. However, the shadow functional unit continues the execution of the UMULL instruction and a computed result will be stored in the shadow register file. Then, when the pseudo-code is re-executed after the interrupt is serviced, a reuse hit will occur, the re-execution is terminated, and the MRF is updated with the result stored in the shadow register file. Thus, re-execution of the UMULL instruction can be avoided and the execution time of the instruction is reduced compared to the execution time of a microcontroller without a shadow functional unit.

Figure 9:
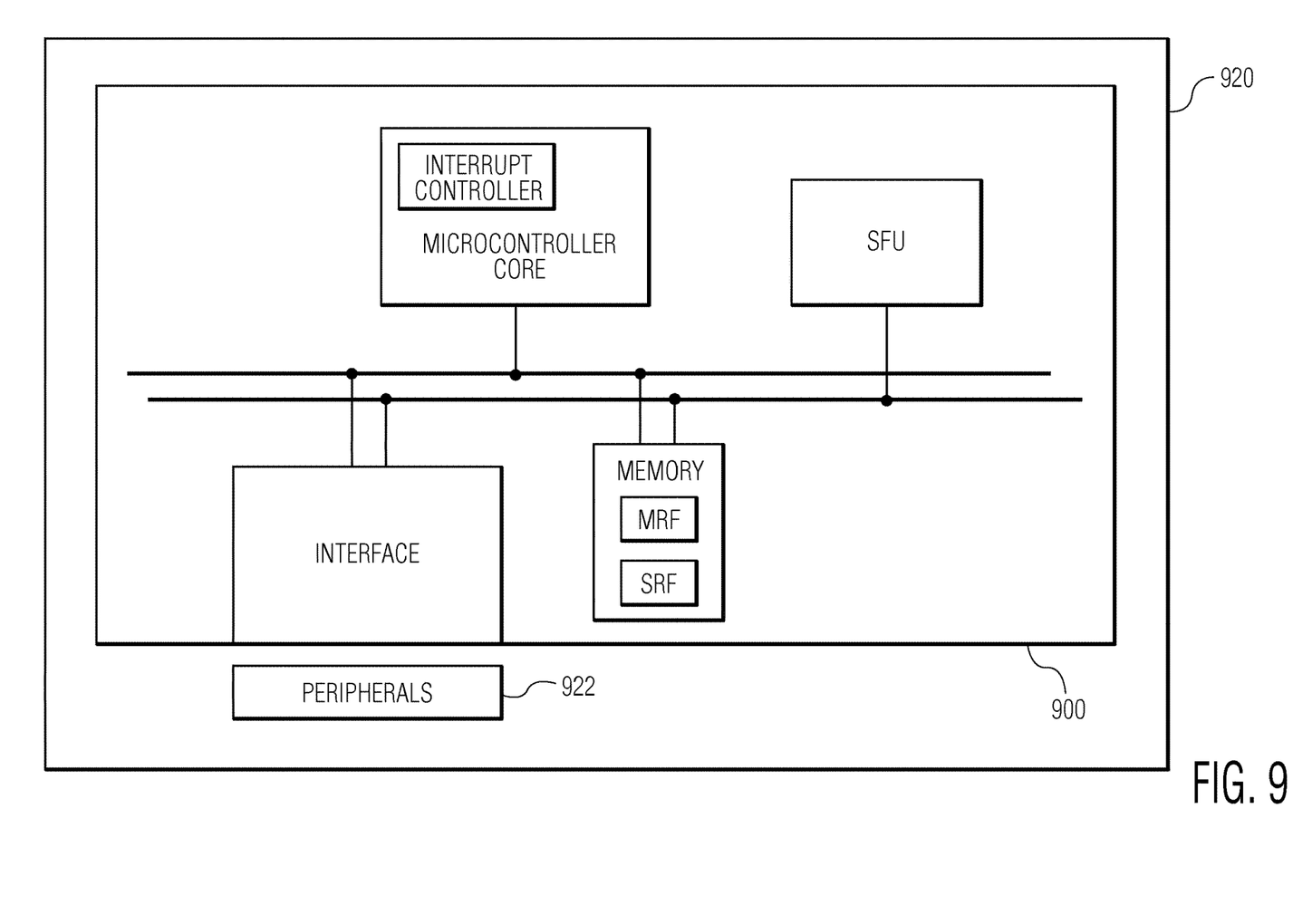
FIG. 9 depicts a diagram of an integrated circuit (IC) device in accordance with an embodiment of the invention.

FIG. 9 depicts a diagram of an integrated circuit (IC) device 920 in accordance with an embodiment of the invention. The IC device includes a microcontroller 900, such as the microcontroller described with reference to FIG. 5 and peripherals 922 configured to detect conditions for generating interrupts and transmitting the interrupts to the interface accordingly. For example, the IC device could include peripherals such as an audio sensor or a video sensor (e.g., as in a typical embedded digital signal processor that generates a significant number of interrupts.)

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for processing instructions in a microcontroller, the method comprising:
   upon receipt of an interrupt while an instruction is being executed by a microcontroller core, aborting execution of the instruction by the microcontroller core and completing execution of the instruction by a shadow functional unit while the interrupt is being serviced by the microcontroller core; and
   upon servicing the interrupt, terminating re-execution of the instruction by the microcontroller core and updating a main register file with a result of the execution of the instruction by the shadow functional unit.

2. The method of claim 1, wherein terminating re-execution comprises:
   comparing a program counter (PC) and operands of the instruction with PCs and operands stored in a shadow register file; and
   if the comparison finds a match between the PC and operands of the instruction and at least one of the PCs and corresponding operands in the shadow register file, then a main register file is updated with the result associated with the matching PC and operands stored in the shadow register file; and
   if the comparison does not find a match between the PC and operands of the instruction and at least one of the PCs and corresponding operands in the shadow register file, then the main register file is updated with a result computed by the shadow functional unit using the PC and operands of the instruction.

3. The method of claim 2, wherein comparing a PC and operands of the instruction and PCs and operands stored in the shadow register file comprises using a set of comparators.

4. The method of claim 1, wherein the shadow functional unit is activated when the instruction is fetched from instruction memory.

5. The method of claim 1, wherein the shadow functional unit is activated when the interrupt is received.

6. The method of claim 1, wherein completing execution of the instruction by the shadow functional unit further comprises storing the result in a shadow register file.

7. The method of claim 1, wherein if a second interrupt is received before the received interrupt is serviced, the second interrupt is serviced before terminating re-execution of the instruction.

8. The method of claim 1, wherein if a plurality of interrupts are received before a microcontroller core begins to service an interrupt in the plurality of interrupts, the interrupt with the highest priority is serviced first.

9. The method of claim 1, wherein prior to the receipt of an interrupt and the execution of an instruction, the method further comprises comparing a PC and operands of the instruction with PCs and operands stored in a shadow register file; and
   if a match between the PC and operands of the instruction and at least one of the PCs and corresponding operands in the shadow register file is found, then execution of the instruction is terminated and a main register file is updated with the result associated with the matching PC and operands stored in the shadow register file; and if a match between the PC and operands of the instruction and a PC and corresponding operands in the shadow register file is not found, then the instruction is executed.

10. The method of claim 1, further comprising:

receiving a second interrupt before the received interrupt is serviced and serving the second interrupt after an interrupt service routine (ISR) corresponding to the received interrupt completes execution; and receiving a third interrupt when the interrupt service routine (ISR) corresponding to the received interrupt executes and deciding not to service the third interrupt.

11. A system for processing instructions in a microcontroller, the system comprising:

an interface, the interface configured to receive an interrupt;

a microcontroller core coupled to the interface, the microcontroller core configured to abort the execution of an instruction to service a received interrupt and to terminate re-execution of the instruction by the microcontroller core upon servicing the interrupt;

memory coupled to the microcontroller core, the memory configured to store the instruction and a handler for the interrupt; and a shadow functional unit coupled to the interface and the memory, wherein the shadow functional unit is configured to execute the instruction while the interrupt is being serviced by the microcontroller core.

12. The system of claim 11, further comprising comparators, the comparators configured to compare a program counter (PC) and operands of the instruction with PCs and operands in a shadow register file; and wherein if a match between the PC and operands of the instruction and at least one PC and operands in the shadow register file is found, the microcontroller core is further configured to update a main register file with a result corresponding to the match; and wherein if a match between the PC and operands of the instruction and at least one PC and operands in the shadow register file is not found, the microcontroller core is further configured to direct the shadow functional unit to execute the instruction to compute a result and to update the main register file with the computed result.

13. The system of claim 11, wherein the shadow functional unit is configured to be inactive until an interrupt is received.

14. The system of claim 11, wherein the shadow functional unit is configured to concurrently receive the instruction when the microcontroller core fetches the instruction.

15. The system of claim 11, wherein the shadow functional unit is configured to store the result of executing the instruction in a shadow register file.

16. The system of claim 11, wherein the microcontroller core is configured to service a second received interrupt before re-executing the instruction.

17. The system of claim 11, wherein the interface is configured to receive a plurality of interrupts and the microcontroller core is configured to service the interrupts based on the priority of the interrupt.

18. The system of claim 11, wherein the memory is configured to store the main register file and the shadow register file.

19. An integrated circuit (IC) device comprising:

a microcontroller system having:

an interface, the interface configured to receive an interrupt;

a microcontroller core coupled to the interface, the microcontroller core configured to abort the execution of an instruction to service a received interrupt and to terminate re-execution of the instruction by the microcontroller core upon servicing teh interrupt;

memory coupled to the microcontroller core, the memory configured to store the instruction and a handler for the interrupt; and a shadow functional unit coupled to the interface and the memory, the shadow functional unit configured to execute the instruction while the interrupt is being serviced by the microcontroller core; and peripherals coupled to the microcontroller configured to detect conditions for generating interrupts and transmitting interrupts to the interface accordingly.

* * * * *